United States Patent [19]

Gupta et al.

[11] Patent Number: 5,113,180

[45] Date of Patent: May 12, 1992

[54] VIRTUAL DISPLAY ADAPTER

[75] Inventors: Satish Gupta, Peekskill; Steven P. Larky, New York; Alan W. Peevers, Peekskill, all of N.Y.; Joe C. St. Clair, Round Rock, Tex.

[73] Assignee: International Business Machines Corporation, Armonk, N.Y.

[21] Appl. No.: 183,795

[22] Filed: Apr. 20, 1988

[51] Int. Cl.$^5$ .............................................. G09G 1/14
[52] U.S. Cl. ...................... 340/747; 340/723; 340/750; 340/799
[58] Field of Search ............... 340/747, 750, 799, 721, 340/723; 364/200, 521

[56] References Cited

U.S. PATENT DOCUMENTS

| | | | |
|---|---|---|---|
| 4,096,568 | 6/1978 | Bennett et al. | 364/200 |
| 4,249,172 | 2/1981 | Watkins et al. | 340/750 |
| 4,325,120 | 4/1982 | Colley et al. | 364/200 |
| 4,598,384 | 7/1986 | Shaw et al. | |
| 4,651,146 | 3/1987 | Lucash et al. | |
| 4,688,167 | 8/1987 | Agarwal | |
| 4,807,119 | 2/1989 | Suga | 364/200 |
| 4,809,142 | 2/1989 | Agarwal | 340/723 |
| 4,955,024 | 9/1990 | Pfeiffer et al. | 364/200 |

FOREIGN PATENT DOCUMENTS

| | | | |
|---|---|---|---|
| 0150453 | 8/1985 | European Pat. Off. | 340/747 |
| 0182454 | 5/1986 | European Pat. Off. | 340/799 |

*Primary Examiner*—Ulysses Weldon
*Assistant Examiner*—M. Fatahiyar
*Attorney, Agent, or Firm*—Perman & Green

[57] ABSTRACT

A display control such as a virtual display adapter allows the advanced functions of a display controller to be utilized in a large area of memory in addition to the normal use in display memory. This large area of memory includes system memory, and efficient access to this large area of memory is permitted for normal system use. The display controller also functions with non-contiguous and non-resident bitmaps. The flexibility of demand-paged virtual memory is utilized for display tasks, as display bitmaps may be written to the large area of memory as well as the display memory.

25 Claims, 7 Drawing Sheets

VIRTUAL DISPLAY ADAPTER

DESCRIPTION

1. Technical Field

The invention is in the field of display controllers, and specifically is directed to a virtual display adapter which includes means for accessing and updating a plurality of display bitmaps of significant size which may be located in non-contiguous and non-resident memory, as well as in display memory.

2. Background Art

Conventional display adapters have a limited amount of display memory. This display memory is the only memory the advanced functions provided by the adapter can utilize. These advanced functions vary, but typically consist of line drawing, Bit Boundary Block Transfer (BitBlt), area fill, polygon draw, pixel manipulation, and the like. It is advantageous for application software to utilize the adapter's advanced functions because they offer a large performance improvement over conventional software methods. In many cases the performance improvement is of the order of a ten-fold increase. When application software wants to draw a line (or BitBlt) it can take advantage of the adapter's advanced functions only if the bitmap to be accessed (or bitmaps in the case of BitBlt copy) is in the adapter's display memory. If the bitmap(s) are not in the adapter's display memory then conventional software techniques must be used at reduced performance relative to the hardware advanced functions. In addition, it is an extra burden for the software to determine when the advanced function is available for use. A common approach utilized is to provide more memory on the display adapter. The additional memory allows more than just the screen sized bitmap to be a target for advanced functions. However, current windowing systems use many bitmaps of a very large size. It is not always possible to provide sufficient memory on the display adapter, therefore the software must always check to determine if the advanced functions can be utilized, and if not to provide a suitable software routine.

There are a number of patents directed to display controllers, each having certain advantages and disadvantages. A number of such patents are set forth below.

U.S. Pat. No. 4,484,302 to Cason et al., entitled "Single Screen Display System With Multiple Virtual Display Having Prioritized Service Programs and Dedicated Memory Stacks" is directed to an interrupt driven software strategy which allows multiple screen areas for use by various system services. A reentrant Display Access Method (DAM) program writes various "virtual" text screens into a frame buffer at locations specified in each screen's Display Control Block (DCB). Each device (e.g. diskette, printer) has a dedicated service program which maintains it's device's virtual text buffer and DCB. Separate text buffers are allocated for each virtual screen and subsequently accessed by the DAM. Higher-level device interrupts cause the DAM to suspend current display operations and begin displaying data from the higher-priority device's message buffer. Upon completion, the DAM resumes the interrupted display operation. This is a text-only system, which includes static allocation of specific screen areas to specific devices, i.e. one area for diskette messages, one for printer messages, one split application area, and one prompt area. Support is provided for two separate application areas, side-by-side. This is a text-processing oriented system with no graphics capability, and with no paging mechanism. There is a dedicated contiguous screen region for each device or task, without the capability to store bitmaps at non-contiguous locations in one or more memories. Screen dimensions and locations appear to be fixed, as opposed to having dynamic bitmap allocation, where an application can request a virtual bitmap of arbitrary dimensions, with a screen manager placing these bitmaps at arbitrary locations on the physical screen.

U.S. Pat. No. 4,533,910 to Suckonick et al., entitled "Graphics Display System with Viewports of Arbitrary Location and Content" is directed to a display system which includes a Pixel/Control Memory that stores both pixels and control word sequences (CWS). There are means for interpreting the CWS to get the pixels from the pixel memory and put them in a FIFO. Also, there are means for further interpreting the same or other CWS to map the FIFO contents to the screen. Suckonick is directed to mapping a pixel memory to the screen, as opposed to generating the images in the pixel memory. Bitmaps comprising a viewport may be non-contiguous only if all portions of the viewport are contained in the pixel memory as opposed to being scattered through the real memory or backing store. There is no teaching as to how viewport information may be scattered, or how to view this information as a contiguous entity. Further, there is no indication set forth relative to how a pixel memory may also be used as a system memory to hold programs, data, or the like.

U.S. Pat. No. 4,542,376 to Bass et al., entitled "System for Electronically Displaying Portions of Several Different Images on a CRT Screen Through Respective Prioritized Viewports" is directed to a display system which has no frame buffer, and in which pixels are taken from one or more images in memory and then moved directly to the CRT. Means are included for identifying where the image is stored in memory and correlating the location of the viewport on the screen with the memory image. Here again, the system is directed to mapping memory to the display screen, as opposed to generating the pixels in the pixel memory. There is no provision for displaying images that are not stored in the memory array. That is, the pixel memory cannot be scattered through real memory as well as the backing store. The image is stored as a whole in a section of memory rather than being stored in non-contiguous memory.

Other patents of general interest in the display arts are set forth below.

U.S. Pat. No. 4,116,444 to Mayer et al, entitled "Method For Generating a Plurality of Moving Objects on a Video Display Screen" is directed to a system of time shared hardware to provide for a change in position of the moving objects on the video screen. The method includes an object storage memory which may be updated during each vertical retrace interval and is scanned during each horizontal retrace interval to provide information for a horizontal memory which generates the next horizontal video display line. The horizontal memory contains an object identification code in the proper horizontal location and the actual video image is generated by an associated graphics generator and picture memory which respond to the object code.

U.S. Pat. No. 4,642,790 to Minshull et al., entitled "Presentation Space Management and Viewporting On a Multifunction Virtual Terminal" is directed to an interactive display system which includes a display terminal on which an operator may display the data contained in windows or formatted application data in selected viewports on the screen. The system is provided with storage, both read and virtual, into which a presentation interface service loads dynamically the entire formatted data of each application as it is invoked by the user. A screen manager maps the data contained in the defined windows into locations of a programmable symbol refresh buffer determined by the corresponding position of viewports on the screen defined by the user and through which the windows are to be viewed.

U.S. Pat. No. 4,656,596 to Thaden et al., entitled "Video Memory Controller" is directed to controlling a DRAM (dynamic random access memory) used as a video memory and as a system memory. The video memory and the video memory controller are normally a part of a video system which includes a data processor, the video memory, the video memory controller, CRT controller and a CRT display device. The video memory controller includes a row address latch for storing a row address from the data processor, a column address latch for storing a column address from a data processor, a refresh address register for storing a memory refresh address and a display update generator for sequentially generating the addresses necessary for update of the CRT display. A multiplexer couples the proper address to the video memory under control of a memory cycle generator which generates the timing of the memory refresh and display update. An arbiter device enables only one of the possible memory cycles at a time. The data processor has higher priority over memory refresh during an initial period of each horizontal line of the display, while the memory refresh has higher priority over the data processor during the final period of each horizontal line.

U.S. Pat. No. 4,656,597 to Bond et al., entitled "Video System Controller With a Row Address Override Circuit" is directed to a video system which is able to change the display on a video monitor with a minimal number of memory transfer cycles. The video system includes a monitor for displaying of processed data, a processor means for processing the data to be displayed, a display memory means divided into a plurality of planes addressable by a row address, the display memory stores the data that has been processed by the processor means. There are additional other sources of data which is processed by the processor means for storing in the display memory and subsequently being displayed by the CRT monitor. A control means controls the data transfer between the data sources, the processor, the display memories, and the CRT monitor and includes a row address override circuit. The row address override circuit comprises a plurality of output logic for providing a write enable signal to a memory plane. Each memory plane is connected to a cross finding output logic circuit. A select means selects a source of data that is to be written to the memory plane, and an override means provides a write enable to a preselected number of memory planes simultaneously with the same predetermined number of output logic circuits.

U.S. Pat. No. 4,660,156 to Guttag et al., entitled "Video System With Single Memory Space For Instruction, Program Data and Display Data" is directed to a video system which includes a processor, CRT monitor, video memory and CRT controller that provides rapid transfer of data to be displayed in both the text and graphics mode.

According to the present invention, a virtual display adapter is implemented which allows the advanced functions of the display controller to be used in a large area of memory while also allowing efficient access to this large area of memory for normal system use (code, data, stack, etc.). Through a paging mechanism, a virtual display controller allows bitmaps to be non-contiguous and even non-resident. Thus the full flexibility of a demand-paged virtual memory environment has been extended for use by display tasks. This flexibility allows a single advanced virtual display controller to handle large bitmaps without a strict limitation on their size or number.

A superficial analogy can be drawn relative to the virtual display adapter described herein and existing virtual memory extensions to processors in that it allows an almost unlimited amount of memory to be addressed as if it were real. When using this large memory address space, the application need not be concerned with whether the address location is in system memory or not. A page fault routine is used to restore a missing page to real memory as it is accessed. The standard virtual memory mechanism also allows the virtual pages to be scattered in real memory, virtual addresses need not be contiguous in real memory.

However, the virtual display adapter provides other advantages not found in or associated with virtual memory. The chief difference is the use of hardware to allow the real memory location to appear in one of many different real memory sub-systems. The real memory location could be in system memory, display memory, memory on a system bus adapter, or memory on a remote computer accessed via a memory block on a Local Area Network adapter.

Another differentiation of the virtual display adapter from conventional virtual memory is the combination of the virtual memory controller with a specific hardware co-processor, in this case a display controller. By combining the virtual memory translation with the controller, the virtual translation algorithm can be chosen such that it is best suited to the specific task at hand. The type of translation algorithm favored by the general nature of the processor tasks can be different from the algorithm that works best for a display controller. As an example, the translation lookaside buffer (TLB) for a display adapter can be separated into source and destination buffers. This separation provides more translation lookaside buffer hits than would normally be realized.

DISCLOSURE OF THE INVENTION

A virtual display adapter allowing the advanced functions of a display controller to be used in a large area of memory while also allowing efficient access to this large area of memory for normal system use (code, data, stack, etc.) is described. In addition to access to a large area of memory, the display controller can also work with non-contiguous bitmaps or even bitmaps that are temporarily non-resident. The full flexibility of a demand-paged virtual memory environment is extended for use by display tasks.

BEST MODE OF CARRYING OUT THE INVENTION

Figure 1:
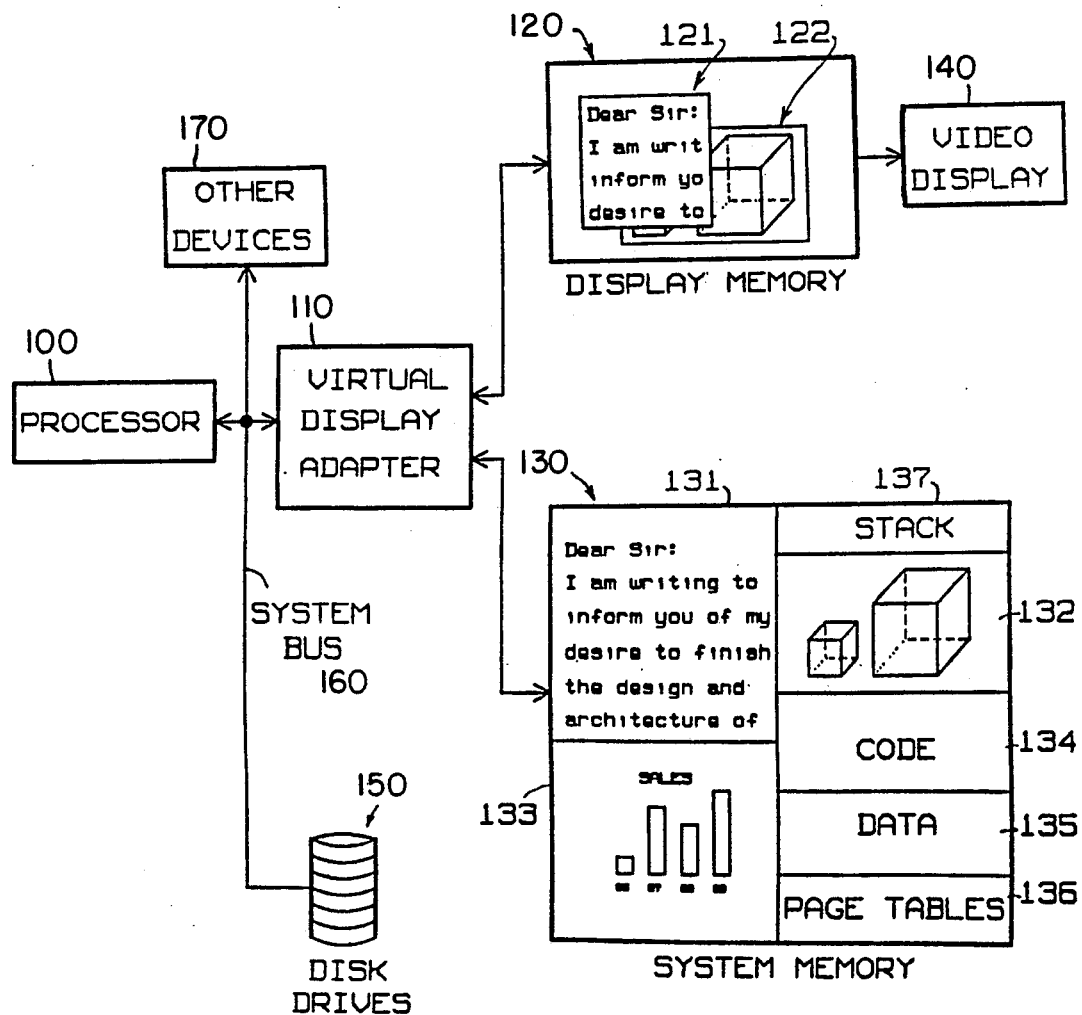
FIG. 1 is a block diagram of a video display workstation including a virtual display adapter.

A virtual display adapter is set forth which introduces the concept of a consistent memory model. All advanced display controller functions can be used in both physically displayable memory and regular system memory. The application no longer needs to know whether it is currently displayed on the user's screen. This is only a part of the solution, for when several tasks are each given their own window, large amounts of memory are required.

The invention introduces the concept of demand-paged virtual bitmaps. The concept behind paging is to split up the memory into many discrete sections or pages, typically 4 kilobytes. These pages can be readily intermixed in real memory, since each is the same size. A page table is maintained to show the mapping between the virtual memory and the physical memory (essentially an "address book" showing where sections of the bitmap reside). Paging has been in use with regular system memory, but the invention applies the concept to bitmaps.

Supporting paged bitmaps requires a special display controller that knows how to properly access the page tables. This virtual display controller accesses the page table whenever it generates addresses on its own. For example, whenever the virtual display controller draws a line, each successive point on the line is represented by a new address. The new address is a virtual address and is looked up in the page table in order to convert it to a physical pixel address. While looking up the address in the page table, the virtual display controller also checks to be sure the virtual address is actually somewhere in memory. If not, the virtual address must be fetched (presumably from disk) and the page table updated. Then the lookup is completed and the point on the line is drawn. The physical pages need not be in the same order as the virtual bitmap and can even have "holes" in their allocation. Since the virtual display controller looks up each address and can handle the situation that arises when not all the pages are resident, a new bitmap need not tie up a large chunk of memory. Rather, the memory can be allocated as required, so the user does not experience a large delay every time a new bitmap is created while a large contiguous block of memory is created. In addition to checking for the presence of virtual addresses by reading page tables, the display controller checks for "read" and "write" permission and maintains "accessed" and "dirty" bits in the page table.

With multiple bitmaps or windows in use at one time, it is desirable to allow a single display controller to support them. This requires two conditions:

1. The display controller can apply its functions to other memory areas.
2. The display controller status can be saved and restored.

The virtual display controller handles the first requirement through use of the paging mechanism; addresses are redirected via the page tables. The second requirement is satisfied by allowing the display controller to be suspended into a known state. Once suspended, access to the internal state allows the suspended task's display state to be saved, with a new task's state replacing it. The display controller can then be restarted in this new state.

FIG. 1 illustrates a virtual display adapter as used in a workstation. A processor 100 performs many functions, typically to include running an application, controlling various devices, and computation. When a display application (display application can include text output, graphic output, image output, etc.) is running it has access to advanced functions in the virtual display adapter 110. These advanced functions provide a significant performance increase for typical graphic/text/image operations.

The virtual display adapter provides these functions to all applications for manipulation of bitmaps. The bitmaps may be contained in a display memory 120, a system memory 130, or on a disk 150. Five such bitmaps are shown. Bitmaps 121 and 122 in display memory 120, and bitmaps 131, 132 and 133 in system memory 130. System memory 130 also contains other information such as code 134, data 135, page tables 136 and a stack 137. The virtual display adapter 110 allows the advanced functions to be utilized by the application when drawing bitmaps in display memory 120, when drawing bitmaps in system memory 130, and when drawing bitmaps in other memory that is included in other devices 170 that are accessed via the system bus 160. The key distinction between display memory and system memory is that only bitmaps in display memory can be directly shown on the video display 140. The virtual display adapter, thru the use of BitBlt allows rapid transfer of bitmaps between system memory and display memory.

It is to be appreciated that the invention is applicable to a single large memory which includes the system, display and other information required by the computer system. The same virtual indirection concepts are utilized, whether a single memory or a plurality of memory devices are part of the computer system.

Figure 2:
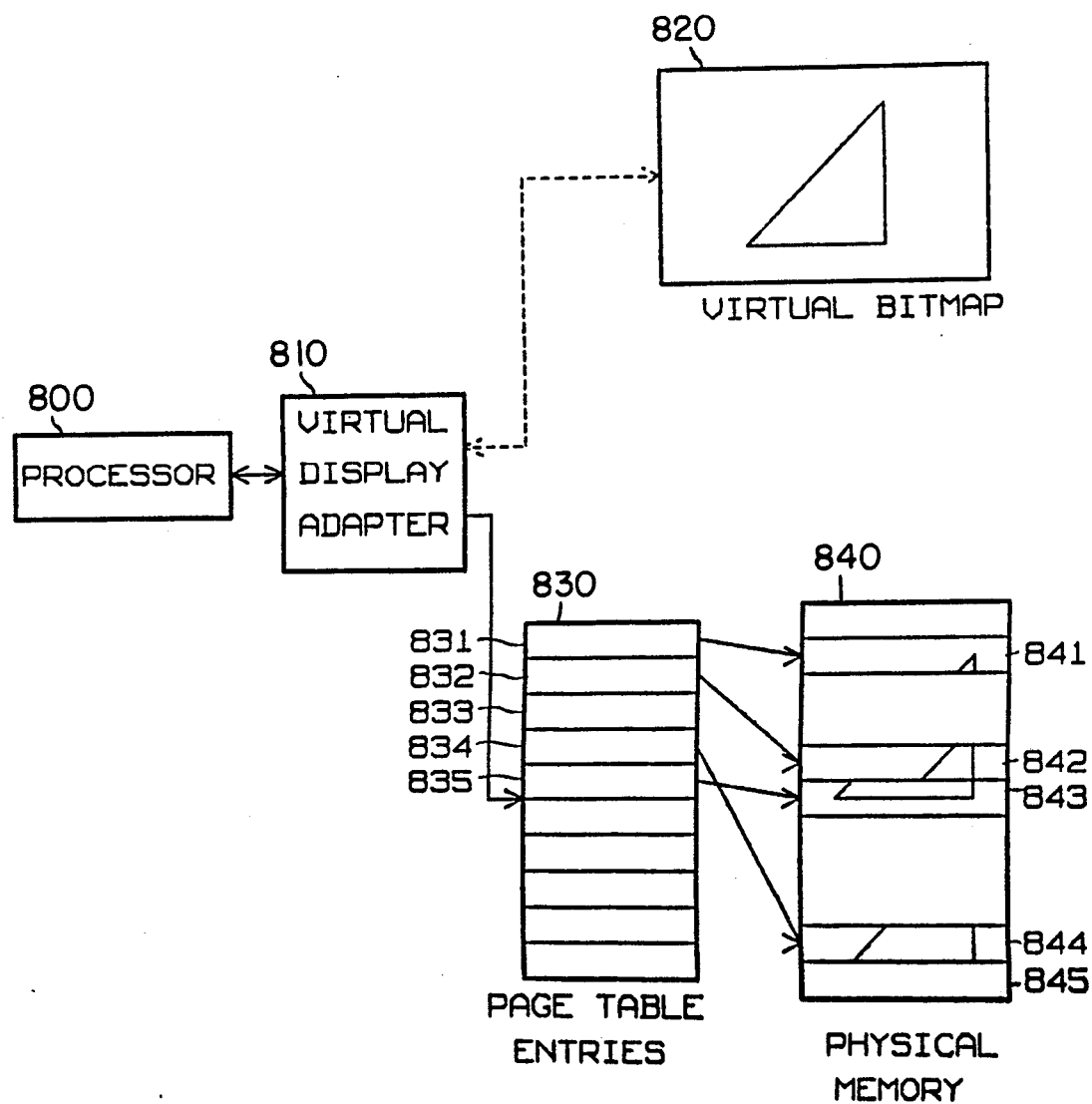
FIG. 2 is a diagram illustrating the use of virtual indirection when graphic assist hardware is used to update a bitmap.

FIG. 2 illustrates the use of virtual indirection for a graphics hardware bitmap update. The processor 800 directs the virtual display adapter 810 to perform a graphic operation. The graphic assist within the virtual display adapter generates the proper sequence of addresses to complete the operation in the virtual bitmap 820. However, the addresses generated by the graphic assist are translated via paging hardware and a page table 830 to physical memory 840. The page table entries either point to a page of physical memory, such as the page table entries, 831, 832, 834, and 835 or indicate that the virtual page is not present as at page table entry 833. Assuming the page is present, the virtual translation mechanism within the virtual display adapter 810 translates the address and performs the graphics operation in the physical pages 841, 842, 843, or 844. The result, as shown in FIG. 2, is that the virtual bitmap 820 is scattered among both physical pages 841, 842, 843, 844, and 845 and not present pages (as indicated by page entry 833 which does not have a pointer to physical memory).

Figure 3:
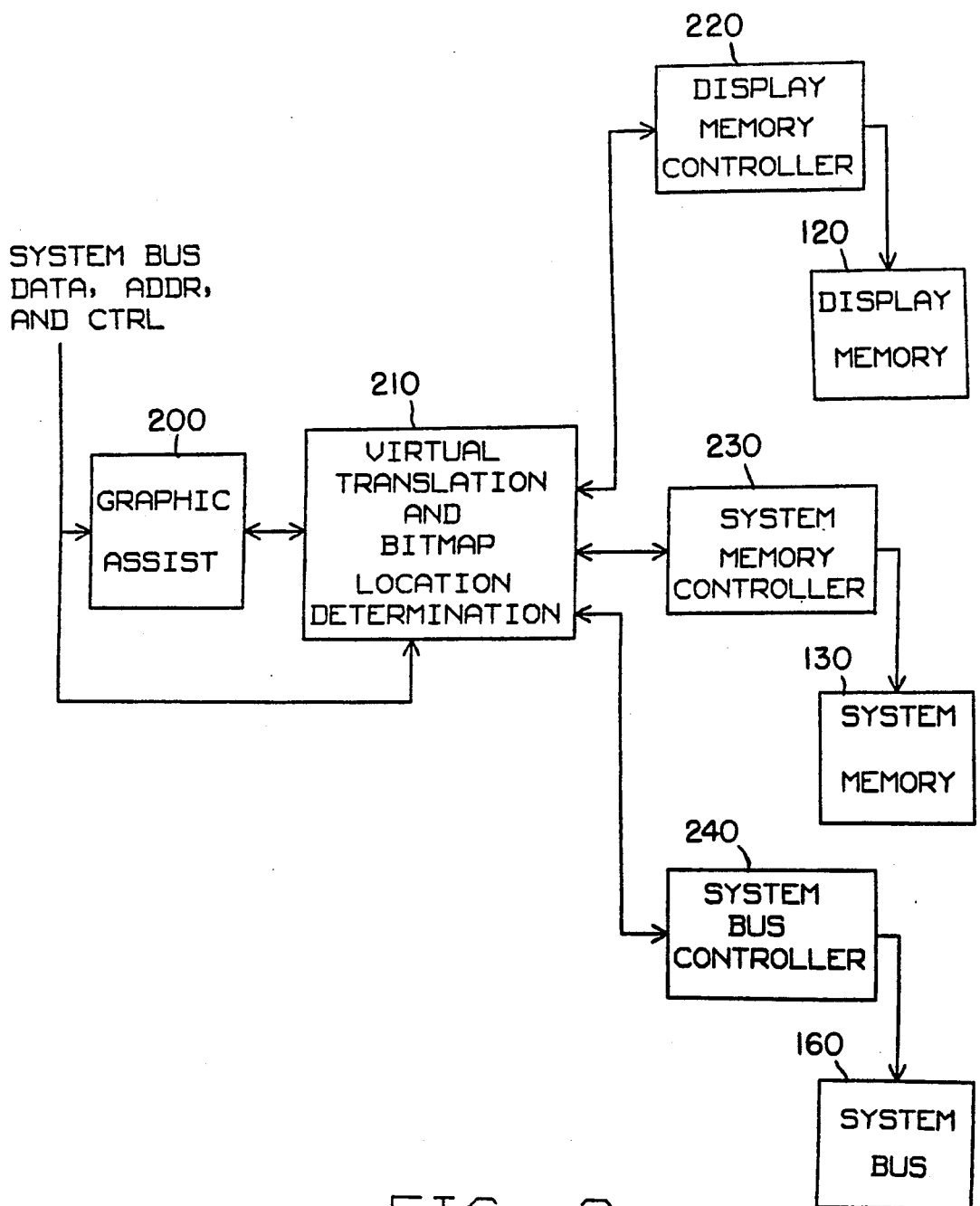
FIG. 3 is a detailed block diagram of the virtual display adapter which is shown in general in FIG. 1.

FIG. 3 is a block diagram of the virtual display adapter 110 of FIG. 1. It includes a graphic hardware advanced function logic block 200, a virtual translation and bitmap location determination logic block 210, and three controllers 220, 230 and 240 for accessing display memory, system memory, and system bus memory, respectively. The graphic hardware advanced function logic block 200 performs a variety of performance assists such as BitBlt, line draw, and pixel manipulation based on requests from the processor 100 or any other master 170 on the system bus 160. It contains internal registers that describe the attributes of various bitmaps such that the graphic hardware can properly generate addresses within bitmaps as it performs the graphic operations. These addresses are then passed on to the virtual translation logic 210. The virtual translation and bitmap location determination logic block translate the bitmap address from the graphic hardware advanced function 200 and passes the request on to the appropriate controller. The display memory controller 220 performs the proper control and address sequencing in order to read and write data from/to the display memory 120. The system memory controller 230 performs the proper control and address sequencing in order to read and write data from/to the system memory 130. The system bus controller 240 performs the proper control and address sequencing in order to read and write data from/to the system bus 160. There may be additional controllers for the other devices 170 that are accessed by the bus controller 240 via the system bus 160.

Figure 4:
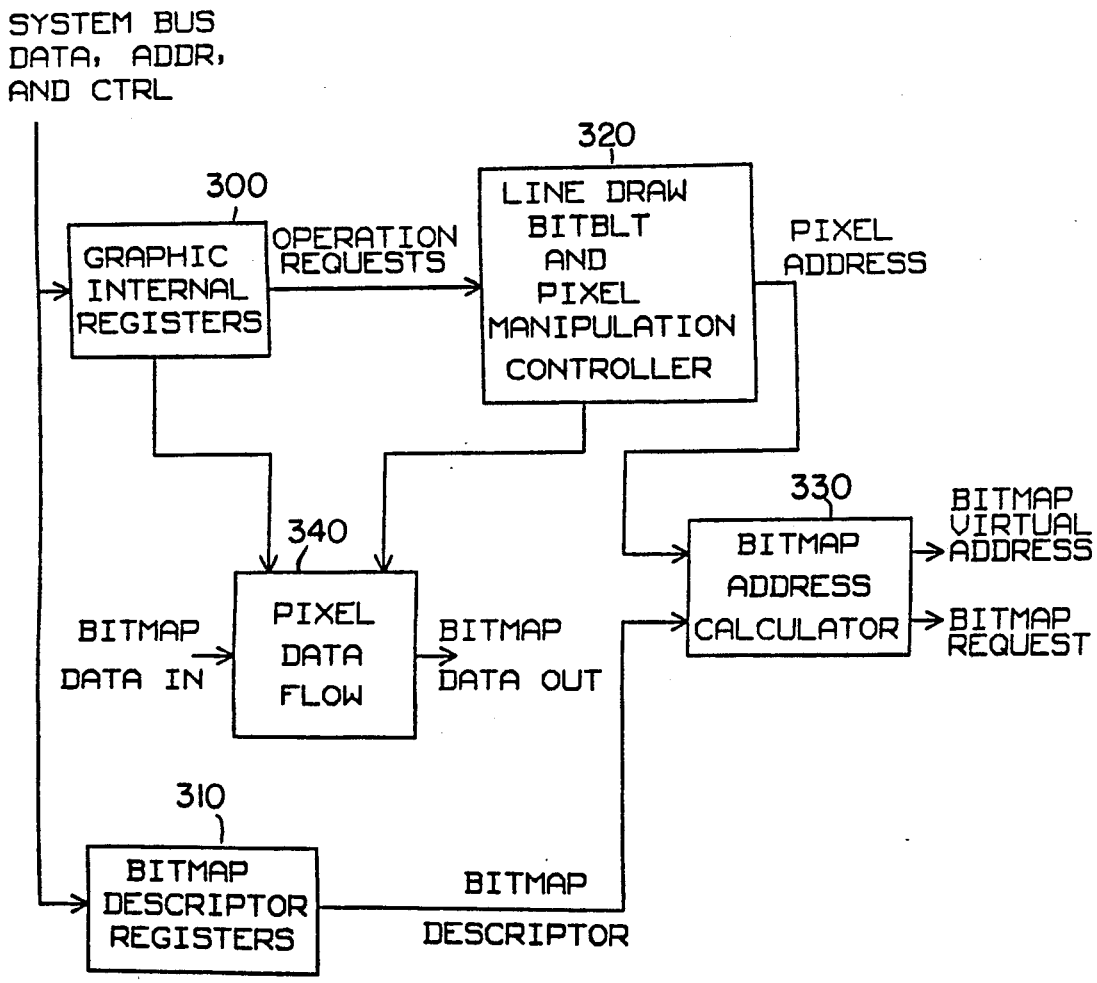
FIG. 4 is a detailed block diagram of the graphic hardware advance function logic which is shown in general in FIG. 3.

FIG. 4 is a more detailed block diagram of the graphic hardware advanced function logic block 200 of FIG. 3. The system bus data, address, and control lines from the processor 100 set graphic internal registers 300 and bitmap descriptor registers 310. The graphic internal registers 300 are decoded to provide control information to a pixel data flow logic 340. The graphic internal registers 300 are also decoded to generate operation requests to the line draw, BitBlt, and pixel manipulation controller 320. The controller 320 generates the proper sequence of pixel addresses to complete the desired pixel operation. In the case of a line draw, the addresses follow the sequence of pixels that connect the starting pixel to the ending pixel along a line. While generating the pixel addresses, the controller 320 also sends control information to the pixel data flow logic 340 such that the proper pixel masking, shifting, and logical functions are performed.

The combination of the internal registers 300, the controller 320, and the pixel data flow 340 is available bundled (along with a bus interface, CRT controller, etc.) as a graphics integrated circuit. For example, the NEC uPD7220 Graphic Display Controller includes a "Drawing Controller" in the block diagram of the chip to perform these functions. (See page 6-48 of NEC's 1984 Microcomputer Products Data Book). Another example is the Intel 82786 CHMOS Graphics Coprocessor, which has a "Graphics Processor" in its block diagram to perform these functions. (See FIG. 2 on Page 4 of the 82786 datasheet dated May 1986).

The bitmap descriptor registers 310 contain a 28-bit bitmap base pointer for each bitmap the controller 320 can access at any given time. The bitmap base pointer is the base of the bitmap in the virtual address space (for this example, the virtual address space is 28-bits or 256 megabytes). The bitmap descriptor registers also indicate the number of bits per pixel for each bitmap. A bitmap address calculator 330 converts the pixel address to a memory byte address based on the number of bits per pixel. For example, if the pixels in the referenced bitmap are 8-bit pixels, then the pixel address need not be shifted to make it a byte address. If the pixels in the referenced bitmap are 4-bit pixels, then the pixel address must be divided by two (shifted right one bit) to form the byte address. The byte address is then added to the bitmap base address to form the bitmap address. Referring to FIG. 3, the bitmap address flows from the graphic hardware advanced function logic block 200 to the virtual translation and bitmap location determination logic block 210.

Figure 5:
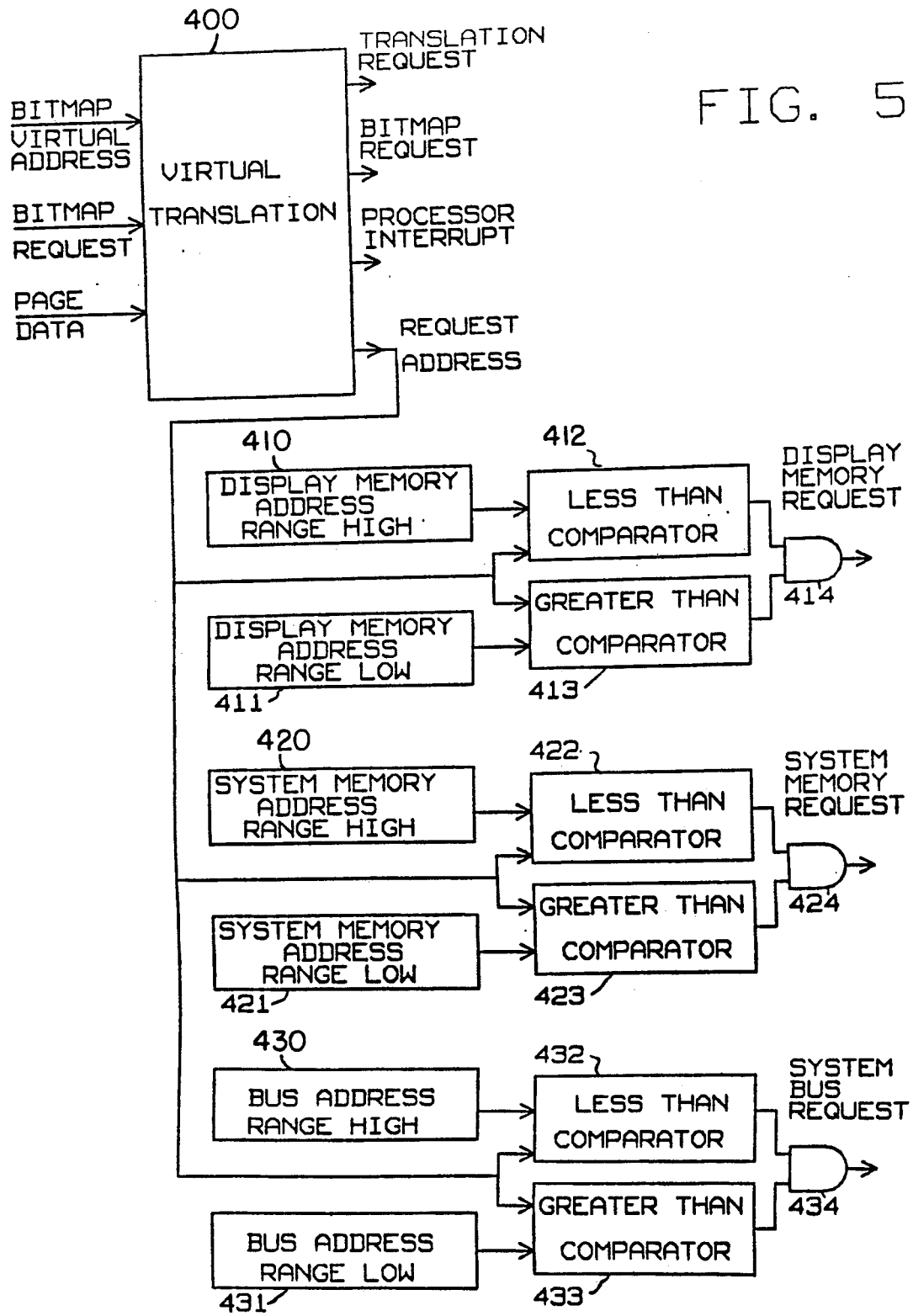
FIG. 5 is a detailed block diagram of the virtual translation and bitmap location determination logic which is shown in general in FIG. 3.

FIG. 5 is a more detailed block diagram of the virtual translation and bitmap location determination block 210 of FIG. 3. The virtual translation block 400 receives the incoming bitmap address and performs a virtual to physical address translation. The translation process generates translation requests to memory as well as processor interrupts. The translation requests along with the request address are fed to three range comparison blocks 410, 420, and 430. The range comparison blocks determine, based on the request address, whether or not the requested memory location is in their respective areas. The display memory address range compare logic (410–414) determines if the request address is a memory location in the display memory 120 (FIG. 1) by comparing the request address to internal registers 410 and 411 which are set by the processor 100 (FIG. 1). If the request address is in the display memory, then a display memory request is generated and the request address is passed to the display memory controller 220 (FIG. 3). A less than comparator 412 determines if the request address from the virtual translation block 400 is less than the top of the display memory address range 410. A greater than comparator 413 determines if the request address is greater than the bottom of the display address range register 411. If the request address is less than the top and greater than the bottom, the output of an AND gate 414 is a display memory request, which is passed on to the display memory controller 220 (FIG. 3).

Similarly, the system memory address range compare logic (420–424) compares with its internal registers the request address to determine if the memory location is in the system memory 130 (FIG. 1). The top of the system memory address range is stored in a register 420, and the bottom of the system memory address range is stored in a register 421. If the request address is above the bottom and below the top, then a system memory request is passed on to the system memory controller 230 (FIG. 3).

The system bus address range compare logic (430–434) also performs a comparison with the request address, and if the test passes, a request is made to the system bus controller 240 (FIG. 3) and the address is passed on. If all three tests fail, then the request address is considered to be in error and the virtual translation block 400 is signaled so the processor can be interrupted.

Figure 6:
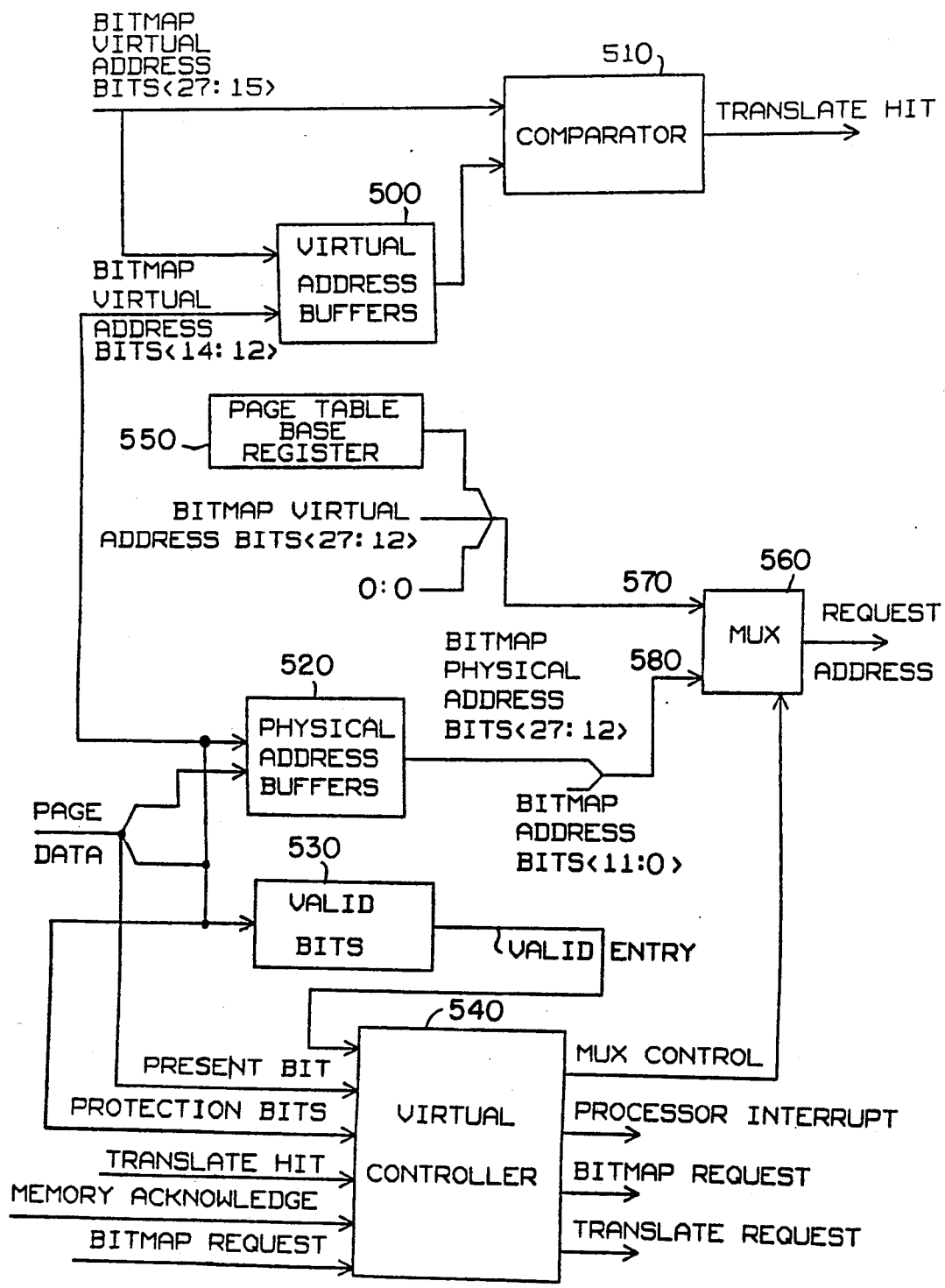
FIG. 6 is a detailed block diagram of the virtual translation logic which is shown in general in FIG. 5.

FIG. 6 is a detailed block diagram of the virtual translation block 400 of FIG. 5. The bitmap virtual address is separated into three parts, the high order bits 27 thru 15, the middle order bits 14 thru 12, and the low order bits 11 to 0. The low order bits represent the bitmap address within a page, and as such are the same for both the virtual bitmap address and the physical bitmap address. The high order and middle order bits combine to form the page address. For performance reasons, whenever a virtual address is translated, the resulting physical address is stored in a buffer 520. Then when subsequent requests for the same virtual address are made, the translation to physical address can be made by a simple table lookup in the physical address buffers 520. For this example, there are eight such buffers. The middle address bits 14 thru 12 are used to determine which one of the eight address buffers may contain the pre-translated address. The virtual translation block contains a controller 540 to control the translation process. The high order address bits are compared using a comparator 510 to the stored virtual address in a virtual address buffer 500. If the address matches, translate hit signal is active. If a valid bit in register 530 for that entry is also active, then the corresponding physical address buffer 520 is used as the high and middle order physical address bits. These bits are concatenated onto the low order bitmap address bits to create the bitmap address 580 and a multiplexor 560 passes it on as the request address. If there is not a translate hit or the valid bit is not active for the particular entry, then the virtual address must be translated.

Figure 7:
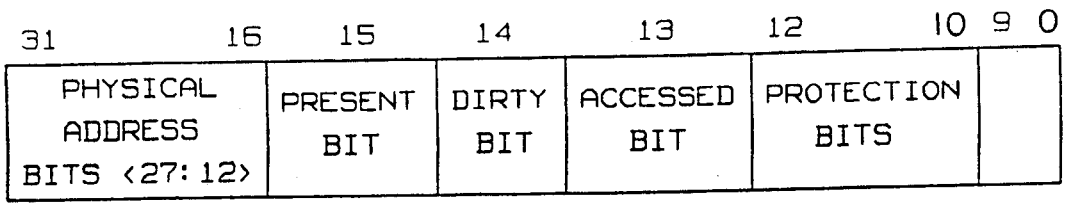
FIG. 7 is a diagram illustrating the page table entry format.

FIG. 7 shows a typical page table entry format. Each 32-bit entry is stored at a 4-byte aligned address (the lower two bits of the byte address are zeros). Bits 31 to 15 contain the high order physical address bits 27 thru 12 for the virtual page corresponding to the entry. Bit 15 is a present bit, if the bit is asserted, then the physical page is present in memory at the physical address in bits 31 thru 16. If the bit is not asserted, then the page is not present in physical memory. Bit 14 is a dirty bit, if it is asserted, then the page has been updated since rt was first transferred to physical memory. Bit 13 is an accessed bit, if it is asserted, then the page has been accessed since this bit was last reset. Periodically scanning and resetting the accessed bit is one way of determining which pages have recently been accessed, useful when determining the page replacement algorithm (better performance is often achieved if the least recently accessed page is transferred out of physical memory to make way for a needed page). Bits 12 thru 10 provide a method of classifying the page for protection purposes. The bits can be used in several ways, including identification of the level of the process that is allowed to access the page, indication of whether or not the page is read only, and indication that the page can be used for instruction storage only. Bits 9 thru 0 are not defined and may be used for various other purposes.

Figure 8:
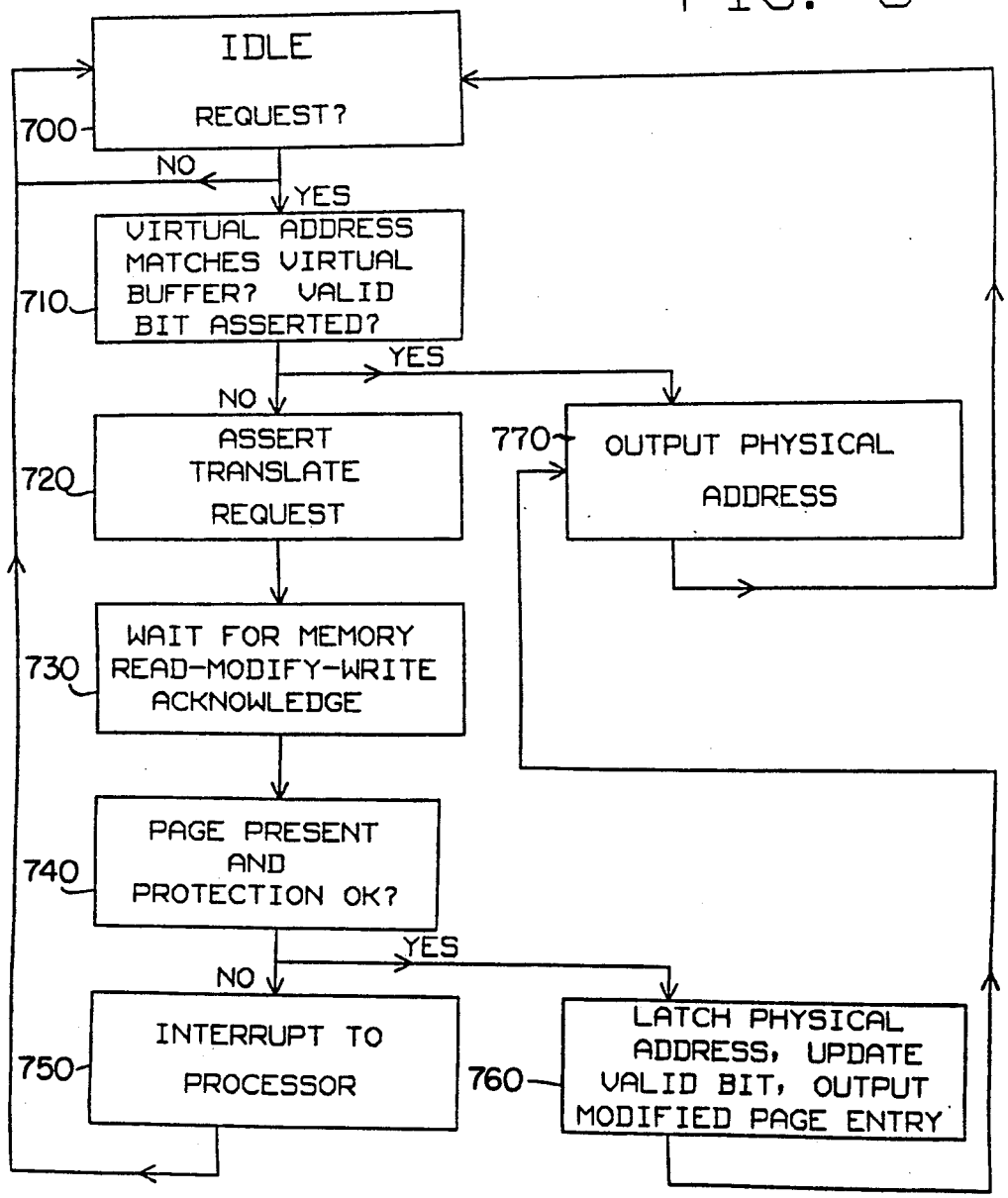
FIG. 8 is a flow chart of the virtual address translation method performed by the virtual controller shown in FIG. 6.

FIG. 8 is a flowchart detailing the translation process when the virtual address needs to be translated into a physical address via the page tables. Reference to the hardware devices of FIG. 6 is made in detailing the flowchart of FIG. 8. The virtual controller 540 waits in State 700, the idle state, waiting for a bitmap request. Upon detection of a bitmap request, State 710 is entered and the bitmap virtual address bits <27:15> are compared to the contents of the correct virtual address buffer 500. The correct virtual address buffer is the one addressed by bitmap virtual address bits <14:12> (three bits addresses eight entries). The correct valid bit in buffer 530, also is addressed by the bitmap virtual address bits <14:12>, and indicates that the virtual buffer 500 and the physical buffer 520 each contain valid data. If the comparator 510 indicates a translate hit and the buffer entries are valid then State 770 follows State 710, otherwise State 720 follows State 710. In State 720 a translate request is sent from the virtual controller 540 and the translation address 570 is sent via the multiplexor 560 as the request address. The translation address 570 is composed of the page table base register 550, which contains the high order address bits of the location of the page table entries, the bitmap high order virtual address bits, and has two zeros to align the byte address on a 32 bit boundary, and then State 730 is entered. In state 730, the virtual controller 540 waits for the memory acknowledge and page data from one of the three controllers (220, 230, or 240 in FIG. 3). Upon receiving the response, State 740 is entered. In State 740, the present bit in the page table entry 550 (FIG. 7) is checked to be sure it is asserted (indicating that the referenced page is actually present at the physical address in the page entry). While in State 740, the protection bits are checked. Checking the protection bits insures that a write does not occur to a read-only page, that application level code cannot corrupt system level data, and prevents one user from corrupting another user's data. If the page is present and the protection checks pass, then State 760 is entered, if not State 750 is after State 740.

In State 760, the physical address portion of the page table entry is latched in the correct physical address buffer 520, the correct valid bit is asserted from logic block 530, and the virtual address is latched in the virtual address buffer 500. While in State 760 the page table entry is modified such that the accessed bit is asserted and the dirty bit is set if the bitmap request is a write. The modified page table entry is then sent to the memory to be used for the write portion of the read-modify-write. State 770 follows State 760. In State 770 the physical address from the physical address buffer 520 is merged with the lower order bits of the bitmap virtual address to form the bitmap address 580, and sent as the request address (via the multiplexor 560) along with a bitmap request from the virtual controller 540. After State 770 the idle state, State 700 is entered.

In State 750 an interrupt is sent to the processor indicating either a not-present page fault or a protection page fault. The actual fault can be determined by the processor by reading an internal register in the virtual controller 720. A page fault handler program is then run by the processor 100 to fix the fault, either by loading the missing page or stopping the application that is violating the protection level. After the missing page is loaded and the page table entry adjusted, the graphic operation is resumed.

The following bitmap update examples refer to FIGS. 1-8. For example, if an application running on the processor 100 (FIG. 1) wishes to draw a line, then it performs a series of IOs to set internal registers in the graphic assist hardware 200 (FIG. 3), and as shown more specifically at graphic internal registers 300 (FIG. 4) as well as the appropriate bitmap descriptors in registers 310 (FIG. 4) in the graphic assist hardware 200 (FIG. 3). With reference to FIG. 4. the controller 320 calculates the proper series of pixel addresses, which are sent to the bitmap address calculator 330. The address calculator 330 uses the pixel address and bitmap descriptor to generate a bitmap virtual address and bitmap request. The virtual address and bitmap request are sent to the virtual translation and bitmap location determination block 210 (FIG. 3), and as shown more specifically at virtual translation block 400 of FIG. 5, which is further detailed in FIG. 6. With reference to FIG. 6, the bitmap virtual address bits 27 thru 15 are passed to the comparator 510 and the virtual address buffer 500.

The bitmap request is sent to the virtual controller 540. The virtual controller 540 steps through the sequence of states detailed in FIG. 8, initially causing a translate request (assuming there was no translate hit). The translate request address 570 is composed from the page table base register 550, the bitmap virtual address bits 27 thru 12, and two zeroes (to put it on a four byte boundary). The translation address is selected by the multiplexor 560 and passed to the address range compare blocks (410-414), (420-424) and (430-434) (FIG. 5). Assuming the address is in the system memory address range, then the less than comparator 422 (FIG. 5) and the greater than comparator 423 (FIG. 5) will both assert their outputs, causing a system memory request from the AND gate 424 (FIG. 5). The system memory request is passed to the system memory controller 230 (FIG. 3), which performs a memory read-modify-write cycle to the system memory 130 (FIGS. 1 and 3) and returns the page table entry to the virtual translation block 400 (FIG. 5, and as detailed in FIG. 6). Referring to the state diagram in FIG. 8, the page present and protection check are performed (State 740), and then the physical address portion of the page table entry (refer to FIG. 7) is latched in the physical address buffers 520 (FIG. 6), the page table entry accessed and dirty bits are modified, and the read-modify-write is completed. Then the virtual controller 540 (FIG. 7), outputs the physical address 580 (State 770) via the multiplexor 560 (FIG. 7) along with the bitmap request. The request address is compared in the range compare blocks (410-414), 420-424) and (430-434) (FIG. 5) to determine where the bitmap lies. Assuming the bitmap is in the display memory, then the request address is detected by the comparator 413 to be greater than the bottom of the display memory range 411 and is detected by the comparator 412 to be less than the top of the display memory range 410 resulting in a display memory request from the AND gate 414 (FIG. 5). The display memory controller 220 (FIG. 3) then performs the proper cycle using the data supplied by the pixel data flow 340 (FIG. 4).

Industrial Applicability

It is an object of the invention to provide an improved display adapter for a display system. It is another object of the invention to provide a virtual display adapter for a workstation.

It is yet another object of the invention to provide a virtual display adapter that is capable of manipulating a display bitmap in memory that is non-contiguous.

It is still another object of the invention to provide a virtual display adapter that is capable of manipulating a display bitmap in memory, where the virtual address from the graphic hardware assist is translated into physical addresses.

It is yet still another object of the invention to provide a virtual display adapter which is capable of determining the status of various bitmaps such that the adapter manipulates bitmaps in either local memory, system memory, or in page memory in a transparent manner such that the application need not be apprised of the bitmap's status.

It is a further object of the invention to provide a virtual display adapter capable of saving its entire internal state and later restoring that state in order to allow multiple tasks to use its advanced functions.

It is still a further object of the invention to provide a virtual display adapter capable of manipulating a display bitmap in memory that is temporarily not present in any memory in the workstation, including the capability to recognize this fact and to signal a routine to fix the missing page and to continue with the hardware advance function.

It is yet a further object of the invention to provide a virtual display adapter that manipulates a display bitmap in a paged memory.

We claim:

1. In a computer graphics system which displays information on a video display, the combination comprising:
   a processor which provides information signals for running display applications which include advanced display functions for creating display information and virtual memory address signals indicative of where the display information is to be created;
   a memory which stores system information at physical addresses, said memory further storing display information at other physical addresses for display on said video display; and
   a display control means, including virtual address translation means, which responds to said information signals and virtual memory address signals from said processor to convert said virtual memory addresses to physical memory addresses at which the display information is to be created in said memory.

2. In a computer graphics system which displays information on a video display, the combination comprising:
   a system memory which stores system information, including storing display information at physical address;
   a display memory which stores display information at physical addresses for display on said video display;
   a processor which provides information signals for running display applications which include advance display functions for creating display information, and for selecting which one of said system memory and said display memory said display information is to be created in; and
   a display control means which responds to said information signals from said processor to generate virtual addresses and to convert said virtual addresses to physical addresses of the selected memory the display information is to be created in.

3. The combination claimed in claim 2, including:
   means included in said display control means for transferring display information from said system memory to said display memory for display on said video display.

4. In a computer graphics system which displays information on a video display, the combination comprising:
   a processor which provides information signals for running display applications which include advanced display functions for creating display bitmaps and virtual memory address signals indicative of where the display bitmaps are to be created;

a system memory which stores system information, including storing display bitmaps at physical memory addresses for display on said video display; and a display control means, including virtual address translation means, which responds to said information signals and virtual memory address signals from said processor to convert said virtual memory addresses to physical memory addresses at which a display bitmap is to be created in said system memory.

5. In a computer graphics system which displays information on a video display, the combination comprising:

a system memory which stores system information, including storing display bitmaps at physical addresses;

a display memory which stores display bitmaps at physical addresses for display on said video display;

a processor which provides information signals for running display applications which include advanced display functions for creating display bitmaps, and for selecting which one of said system memory and said display memory said display bitmaps are to be created in; and a display control means which respond to said information signals from said processor for generate virtual addresses and to convert said virtual addresses to physical addresses of the selected memory a display bitmap is to be created in.

6. The combination claimed in claim 5, including:

at least one other memory which stores information including display bitmaps at physical addresses.

7. The combination claimed in claim 5, wherein said physical addresses of said memories can be non-contiguous.

8. The combination claimed in claim 6, wherein said at least one other memory is non-resident.

9. In a computer graphics system which displays information on a video display, the combination comprising:

a system bus;

at least one device connected to said system bus which includes a memory which stores information including display information at physical addresses;

a system memory which stores system information, including storing display information at physical addresses;

a display memory which stores display information at physical addresses for display on said video display;

a processor connected to said system bus, and which provides information signals for running display applications which include advanced display functions for creating display information, and for selecting which one of the memory of said at least one device or said system memory or said display memory said display information is to be created in; and a display adapter connected to said system bus, and also connected to said system memory and said display memory, and which respond to said information signals from said processor to generate virtual addresses and to convert said virtual addresses to physical addresses of the selected memory the display information is to be created in.

10. The combination claimed in claim 9, including:

means included in said display adapter for transferring display information from said system memory and the memory in said at least one other device to said display memory for display on said video display.

11. The combination claimed in claim 10, wherein said physical addresses can be non-contiguous.

12. In a computer graphics system which displays information on a video display, the combination comprising:

a system memory which stores system information, including storing display bitmaps at physical addresses;

a display memory which stores display bitmaps at physical addresses for display on said video display;

a processor which provides information signals for running display applications which include advance display functions for creating display bitmaps and for selecting which one of said system memory and said display memory said display bitmap is to be created in;

a display control means which responds to said information signals from said processor to generate virtual addresses and to convert said virtual addresses to physical addresses of the selected memory a display bitmap is to be created in, said display control means including:

a first means responsive to said information signals for providing a first signal indicative of the advanced function called for by said information signals; and a second means responsive to said information signals and said first signal for providing a second signal which is indicative of the virtual addresses in the memory in which the display bitmap is to be created.

13. The combination claimed in claim 12, wherein said first means includes:

graphic internal registers responsive to said information signals to provide an operation request signal indicative of the advanced function to be performed;

bitmap descriptor registers responsive to said information signals to provide a bitmap descriptor signal indicative of the number of bits per pixel in said display bitmap;

a manipulation control means responsive to said operation requests signal from said graphic internal registers for providing a pixel address signal indicative of the pixel addresses required to perform the advanced function; and a bitmap address calculator responsive to said bitmap descriptor signal and said pixel address signal for providing a bitmap virtual address signal indicative of the virtual addresses of said display bitmap.

14. The combination claimed in claim 13, wherein said second means include:

a virtual translation means responsive to said information signals and said bitmap virtual address signal for providing a request address signal which is indicative of the physical addresses in the memory in which the display bitmap is to be created.

15. The combination claimed in claim 14, including:

a display memory address range compare network responsive to said request address signal for providing a display memory request signal in response to determining that said display bitmap is to be created in said display memory;

a display memory controller responsive to said display memory request signal for providing a display control signal for creating said display bitmap in said display memory;

a system memory address range compare network responsive to said request address signal for providing a system memory request signal in response to determining that said display bitmap is to be created in said system memory; and a system memory controller responsive to said system memory request signal for providing a system control signal for creating said display bitmap in said system memory.

16. The combination claimed in claim 15, wherein said virtual translation means includes a virtual controller responsive to said information signals for providing translation control signals to said display memory controller and said system memory controller.

17. In a computer graphics system which displays information on a video display, the combination comprising:

a system memory which stores system information, including storing display bitmaps at physical addresses;

a display memory which stores display bitmaps at physical addresses for display on said video display;

a processor which provides information signals for running display applications which include advance display functions for creating display bitmaps and for selecting which one of said system memory and said display memory said display bitmaps are created in;

a display adapter which responds to said information signals from said processor to generate virtual memory addresses and to convert said virtual memory addresses to physical memory addresses of the selected memory a display bitmap is to be created in, said display adapter including:

graphic internal registers responsive to said information signals to provide an operation request signal indicative of the advanced function to be performed; bitmap descriptor registers responsive to said information signals to provide a bitmap descriptor signal indicative of the number of bits per pixel in said display bitmap;

a control means responsive to said operation requests signal from said graphic internal registers for providing a pixel address signal indicative of the pixel addresses required to perform the advanced function;

a bitmap address calculator responsive to said bitmap descriptor signal and said pixel address signal for providing a bitmap virtual address signal indicative of the virtual addresses of the display bitmap;

a virtual translation means responsive to said information signals and said bitmap virtual address signal for providing a request address signal which is indicative of the physical address of the memory in which the display bitmap is to be created; and means for applying said request address signal to the one of said memories in which said display bitmap is to be created.

18. The combination claimed in claim 17, wherein said means for applying said request address signal comprises memory address compare means for providing a memory request signal indicative of the memory said display bitmap is to be created in.

19. The combination claimed in claim 18, including:
memory control means responsive to said memory request signal for providing a memory control signal for creating said display bitmap.

20. A method of operating a computer graphics system which displays information on a video display, said method comprising the steps of:

providing information signals from a processor for running display applications which include advanced display functions for creating display bitmaps and virtual memory address signals indicative of where the display information is to be created;

storing display bitmaps, for display on said video display, at physical memory addresses in a memory which also stores system information; and responding to said information signals and said virtual memory address signals from said processor with a display control means that includes virtual address translation means to convert said virtual memory addresses to physical memory addresses in said memory at which a display bitmap is to be created.

21. A method of operating a computer graphics system which displays information on a video display, said method comprising the steps of:

providing information signals from a processor for running display application which include advanced display functions for creating display bitmaps, and for selecting which one of a system memory and a display memory said display bitmaps are to be created in;

storing display bitmaps at physical addresses in a system memory which also stores system information;

storing display bitmaps at physical addresses in a display memory for display on said video display; and responding to said information signals from said processor by a display control means to generate virtual addresses, and to convert said virtual addresses to physical addresses of the selected one of said system memory or said display memory a display bitmap is to be created.

22. A method of operating a computer graphics system which displays bitmaps on a video display, said method comprising the steps of:

providing information signals from a processor for running display applications which include advance display functions for creating display bitmaps, and for selecting which one of a system memory and a display memory said display bitmaps are to be created in;

storing display bitmaps at physical addresses in a system memory which also stores system information;

storing display bitmaps at physical addresses in a display memory for display on said video display device;

responding to said information signals from said processor by a display controller to generate virtual addresses;

converting said virtual addresses to physical addresses by said display controller of the selected one of said system memory or said display memory a display bitmap is to be created in;

responding to said physical addresses by an address comparator to provide a memory request signal indicative of which one of said system memory or said display memory said display bitmap is to be written to; and providing a memory control signal to the one of said system memory or said display memory wherein said display bitmap is to be written to in response to the provision of said memory request signal.

23. In a computer graphics system which displays information on a video display, the combination comprising:

a system memory that includes physical addresses for storing system information that includes information that is not directly related to information displayed upon said video display, the system memory further including physical addresses for storing display bitmaps;

a display memory which stores display bitmaps at physical addresses, the display memory being coupled to said video display for outputting the display bitmaps thereto;

a processor which provides information signals for running display applications which include advanced display functions for creating display bitmaps, and for selecting which one of said system memory and said display memory said display bitmaps are to be created in; and a display control means responsive to said information signals from said processor to generate virtual addresses and to convert said virtual addresses to physical addresses of the selected memory a display bitmap is to be created in.

24. The combination claimed in claim 23, wherein said converted physical addresses are non-contiguous physical addresses.

25. The combination claimed in claim 23 and further including means for transferring a display bitmap from said system memory to said display memory.

* * * * *